United States Patent
Takahashi (10) Patent No.: US 7,024,108 B2
(45) Date of Patent: Apr. 4, 2006

(54) IMAGE PICKUP APPARATUS WITH PRECISE EXPOSURE VALUE, EXPOSURE DECISION METHOD, PROGRAM, AND STORAGE MEDIUM

(75) Inventor: Kenji Takahashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/173,013

(22) Filed: Jun. 30, 2005

(65) Prior Publication Data

US 2006/0002700 A1 Jan. 5, 2006

Related U.S. Application Data

(63) Continuation of application No. 10/098,869, filed on Mar. 15, 2002.

(30) Foreign Application Priority Data

Mar. 22, 2001 (JP) .............................. 2001-082947

(51) Int. Cl.
*G03B 7/08* (2006.01)
*H04N 5/238* (2006.01)

(52) U.S. Cl. ..................... 396/234; 348/364
(58) Field of Classification Search ................ 396/233, 396/234; 348/221.1, 229.1, 230.1, 296, 349, 348/362–366; 356/222
See application file for complete search history.

(56) References Cited

U.S. PATENT DOCUMENTS

| 5,309,243 | A | * | 5/1994 | Tsai .......................... 348/221.1 |
| 5,473,374 | A | | 12/1995 | Shimizu et al. |
| 5,486,893 | A | * | 1/1996 | Takagi ........................ 396/147 |
| 5,559,555 | A | | 9/1996 | Shimizu et al. |
| 5,818,528 | A | * | 10/1998 | Roth et al. ................... 348/364 |
| 5,831,676 | A | | 11/1998 | Takahashi et al. |
| 5,923,372 | A | | 7/1999 | Han |
| 6,122,450 | A | | 9/2000 | Nakahara et al. |
| 6,621,987 | B1 | | 9/2003 | Tsai et al. |
| 6,628,334 | B1 | | 9/2003 | Gaylord |
| 6,630,960 | B1 | | 10/2003 | Takahashi et al. |
| 6,859,230 | B1 | | 2/2005 | Luo |
| 6,914,630 | B1 | | 7/2005 | Nakamura |
| 2001/0035908 | A1 | | 11/2001 | Kim |
| 2003/0030740 | A1 | | 2/2003 | Tsujino |
| 2005/0030415 | A1 | | 2/2005 | Takizawa |
| 2005/0140819 | A1 | | 6/2005 | Kawamura |

FOREIGN PATENT DOCUMENTS

JP 63-306777 A 12/1988
JP 05-022653 A 1/1993

* cited by examiner

*Primary Examiner*—W. B. Perkey
(74) *Attorney, Agent, or Firm*—Morgan & Finnegan, LLP (57) ABSTRACT

The object of this invention is to increase the precision of an exposure value in a scan AE scheme. To achieve this object, an image is picked at a plurality of exposure values. Screen-split brightness values and exposure value differences are obtained for the respective exposure values. Two screen-split brightness values and exposure value differences are selected from the relationship between the exposure value differences. A brightness value is calculated from the selected values to decide an exposure value in actual exposure.

8 Claims, 6 Drawing Sheets

| 10 | 10 | 10 | 10 | 10 | 10 |
|----|----|----|----|----|----|
| 10 | 25 | 25 | 25 | 25 | 10 |
| 10 | 25 | 50 | 50 | 25 | 10 |
| 10 | 25 | 50 | 50 | 25 | 10 |
| 10 | 25 | 25 | 25 | 25 | 10 |
| 10 | 10 | 10 | 10 | 10 | 10 |

PRIOR ART

FIG. 6

PRIOR ART

IMAGE PICKUP APPARATUS WITH PRECISE EXPOSURE VALUE, EXPOSURE DECISION METHOD, PROGRAM, AND STORAGE MEDIUM

This is a continuation of co-pending application Ser. No. 10/098,869, entitled "IMAGE PICKUP APPARATUS WITH PRECISE EXPOSURE VALUE, EXPOSURE DECISION METHOD, PROGRAM AND STORAGE MEDIUM," which was filed Mar. 15, 2002, the entirety of which is incorporated herein by reference.

FIELD OF THE INVENTION

The present invention relates to an image pickup apparatus, exposure decision method, program, and storage medium.

BACKGROUND OF THE INVENTION

One of means for deciding the exposure of a digital camera is a scan type exposure decision apparatus for performing photometry at predetermined exposure values and deciding optimal exposure on the basis of the photometry data.

According to this method, photometry is done at a plurality of exposure values, and the exposure difference value between the brightness value of a screen and a target brightness value at each exposure value is calculated. The exposure value of actual exposure is decided by using an exposure value having the smallest absolute value of the exposure difference value out of images obtained at these exposure values, and by using the exposure difference value of this exposure value.

However, this apparatus may not accurately calculate an exposure difference value under the influence of the saturation characteristic of a CCD or the like.

The method of obtaining an exposure value in the apparatus will be exemplified.

Figure 5:
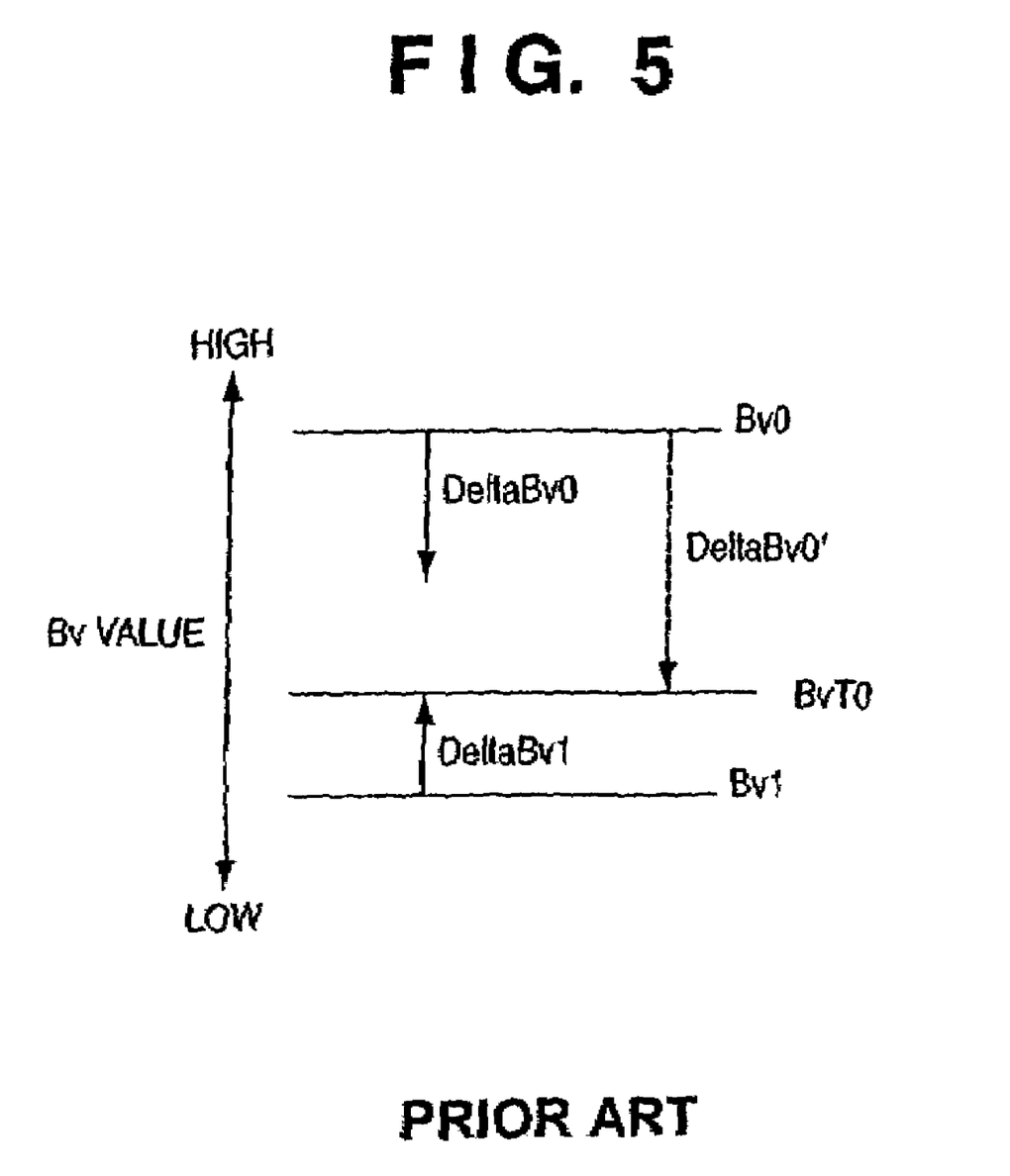
FIG. 5 is a view for explaining a scan type exposure decision apparatus.

In FIG. 5, the ordinate represents the level of the exposure value.

Letting BvT0 be the exposure value of an object, exposure difference values upon exposure at exposure values Bv0 and Bv1 are DeltaBv0 and DeltaBv1. The exposure value difference upon exposure at the exposure value Bv0 does not become DeltaBv0' because the value is clipped due to the saturation characteristic of the CCD and Bv0 is output as a value smaller an actual value.

Comparing the absolute values of DeltaBv0 and DeltaBv1, DeltaBv1 is smaller. An exposure value BvT0 is therefore attained by Bv1+DeltaBv1.

Figure 6:
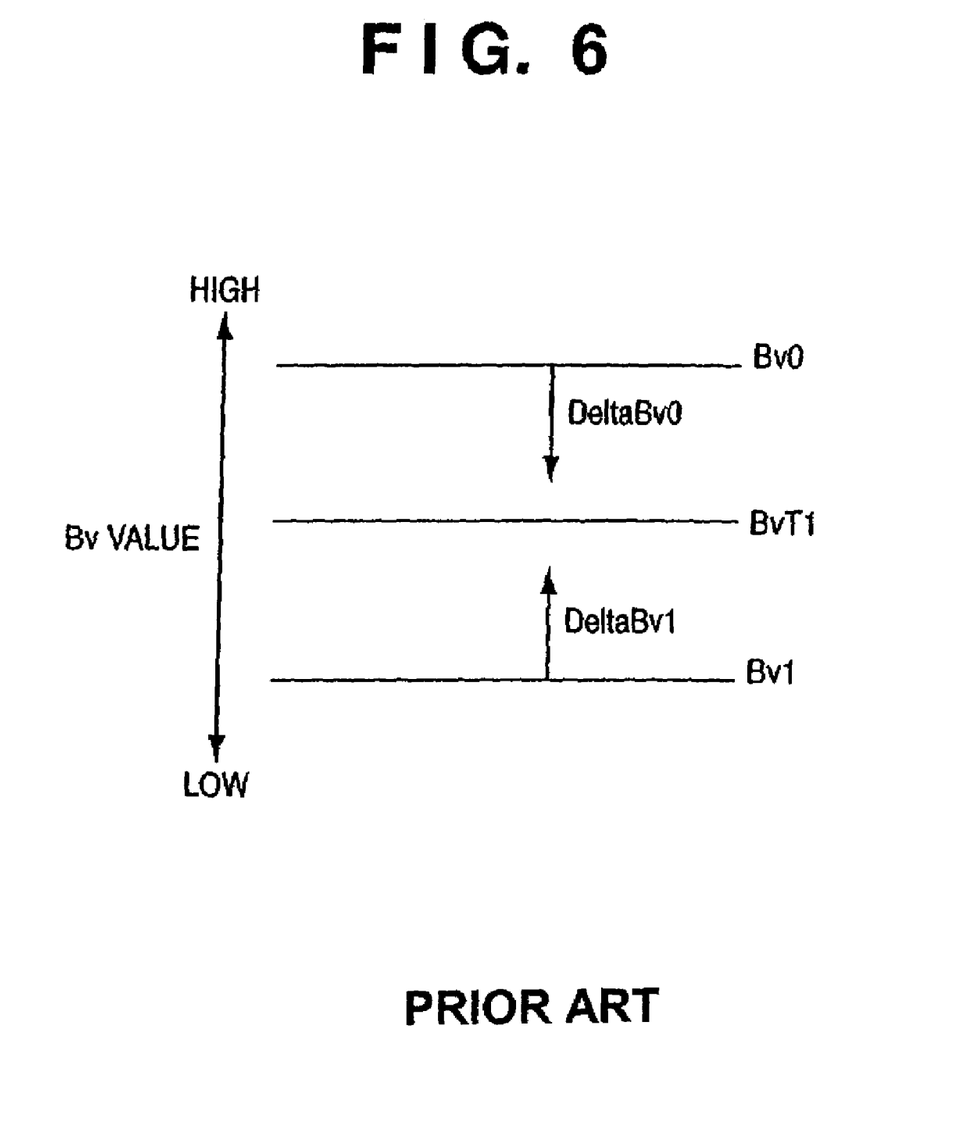
FIG. 6 is a view for explaining the scan type exposure decision apparatus.

If accurate values of both Bv0 and Bv1 cannot be obtained, as shown in FIG. 6, neither Bv0+DeltaBv0 nor Bv1+DeltaBv1 may coincide with BvT1.

This phenomenon prevents accurate determination of the exposure value of an object.

To attain accurate exposure by this method, the number of exposure scan operations must be increased in consideration of CCD saturation and the presence of a nonlinear region. Exposure must be more finely set to minimize errors under the influence of saturation or the like.

This scan must be performed when the user presses the shutter. An increase in the number of scan operations directly leads to an increased shutter time lag.

SUMMARY OF THE INVENTION

The present invention has been made in consideration of the above situation, and has as its object to provide an exposure decision apparatus capable of obtaining an accurate exposure value while minimizing the shutter time lag, an image pickup apparatus having the exposure decision apparatus, a program, and a storage medium.

To solve the conventional problem and achieve the above object, an image pickup apparatus according to the present invention has the following arrangement.

More specifically, the image pickup apparatus comprises an image pickup device that picks up an object, and a processing device having a brightness value calculation unit that obtains brightness values of an image at respective exposure values from a plurality of image data obtained by picking up an image by the image pickup device at a plurality of different exposure values, an exposure difference value calculation unit that calculates exposure difference values representing differences between the brightness values and a preset target brightness value in actual exposure, and an exposure value calculation unit that calculates an exposure value in actual exposure on the basis of at least two image data out of the plurality of image data in accordance with calculation results of the exposure difference value calculation unit.

An exposure decision method according to the present invention has the following steps.

More specifically, the exposure decision method comprises the brightness value calculation step of obtaining brightness values of an image at respective exposure values from a plurality of image data obtained by picking up an image at a plurality of different exposure values, the exposure difference value calculation step of calculating exposure difference values representing differences between the brightness values and a preset target brightness value in actual exposure, and the exposure value calculation step of calculating an exposure value in actual exposure on the basis of at least two image data out of the plurality of image data in accordance with calculation results in the exposure difference value calculation step.

A program according to the present invention has the following processing.

More specifically, a program causes a computer to execute the exposure decision method.

A storage medium according to the present invention has the following structure.

More specifically, a storage medium computer-readably stores the program.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

A preferred embodiment of the present invention will be described below.

Figure 1:
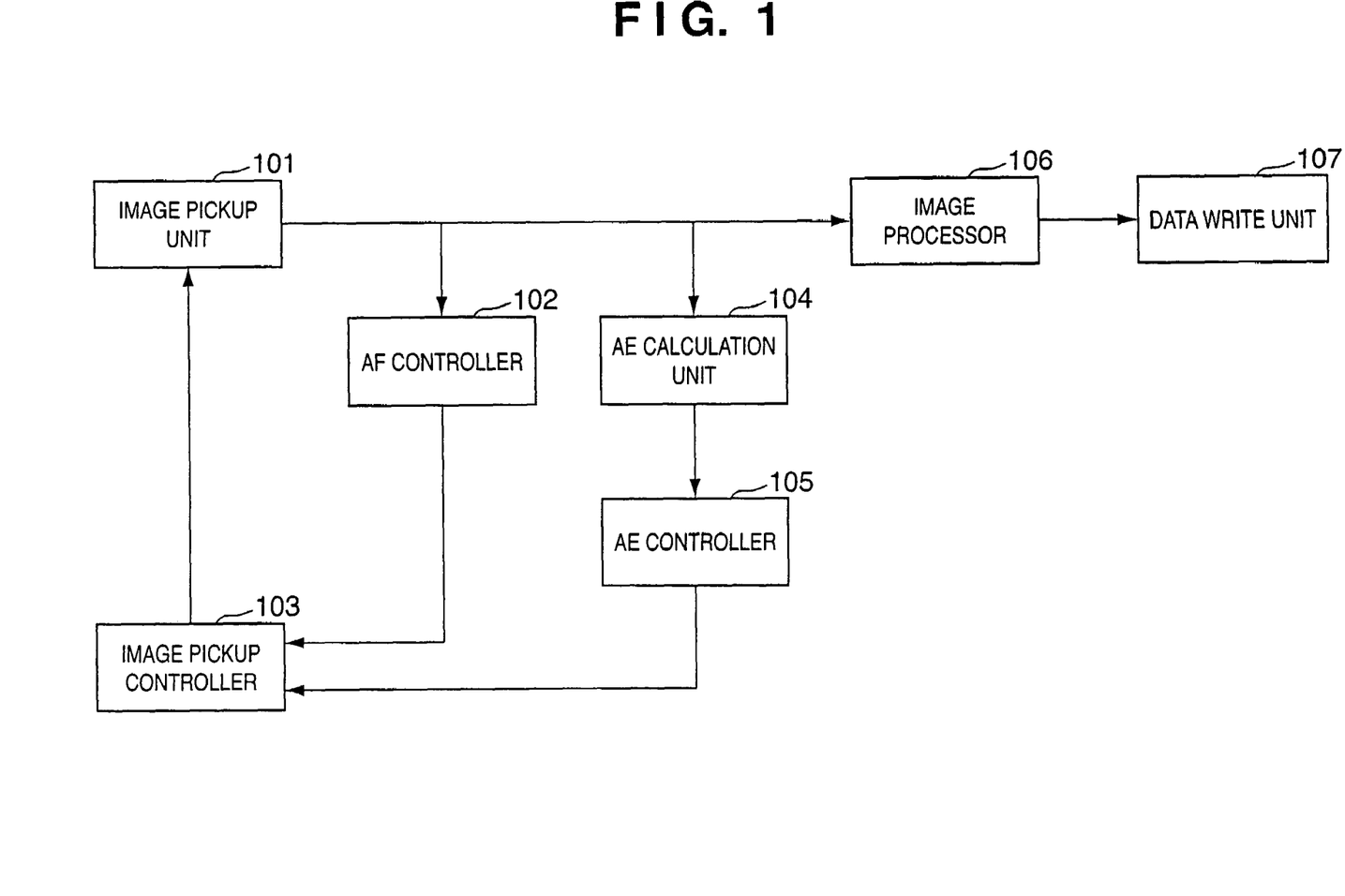
FIG. 1 is a processing block diagram of an embodiment.

FIG. 1 is a schematic block diagram showing a digital camera according to the embodiment of the present invention.

Reference numeral 101 denotes an image pickup unit which includes a lens system, a stop, a shutter, an electronic shutter, an image pickup element such as a CCD, and an A/D converter. The image pickup unit 101 outputs an image projected on the CCD via the lens system as a digital signal.

Reference numeral 102 denotes an AF controller. When the user releases the shutter, the AF controller 102 detects the focus.

Reference numeral 103 denotes an image pickup controller. The image pickup controller 103 executes lens focusing control on the basis of focus data.

After the lens is focused, an AE controller 105 obtains an F-number and electronic shutter speed from a predetermined exposure value ControlBv0, and sends these values to the image pickup controller 103.

The image pickup controller 103 projects an image on the CCD at the received F-number and electronic shutter speed, thus obtaining image data.

The image data controlled and obtained at the exposure value ControlBv0 is sent to an AE calculation unit 104.

Figure 2:
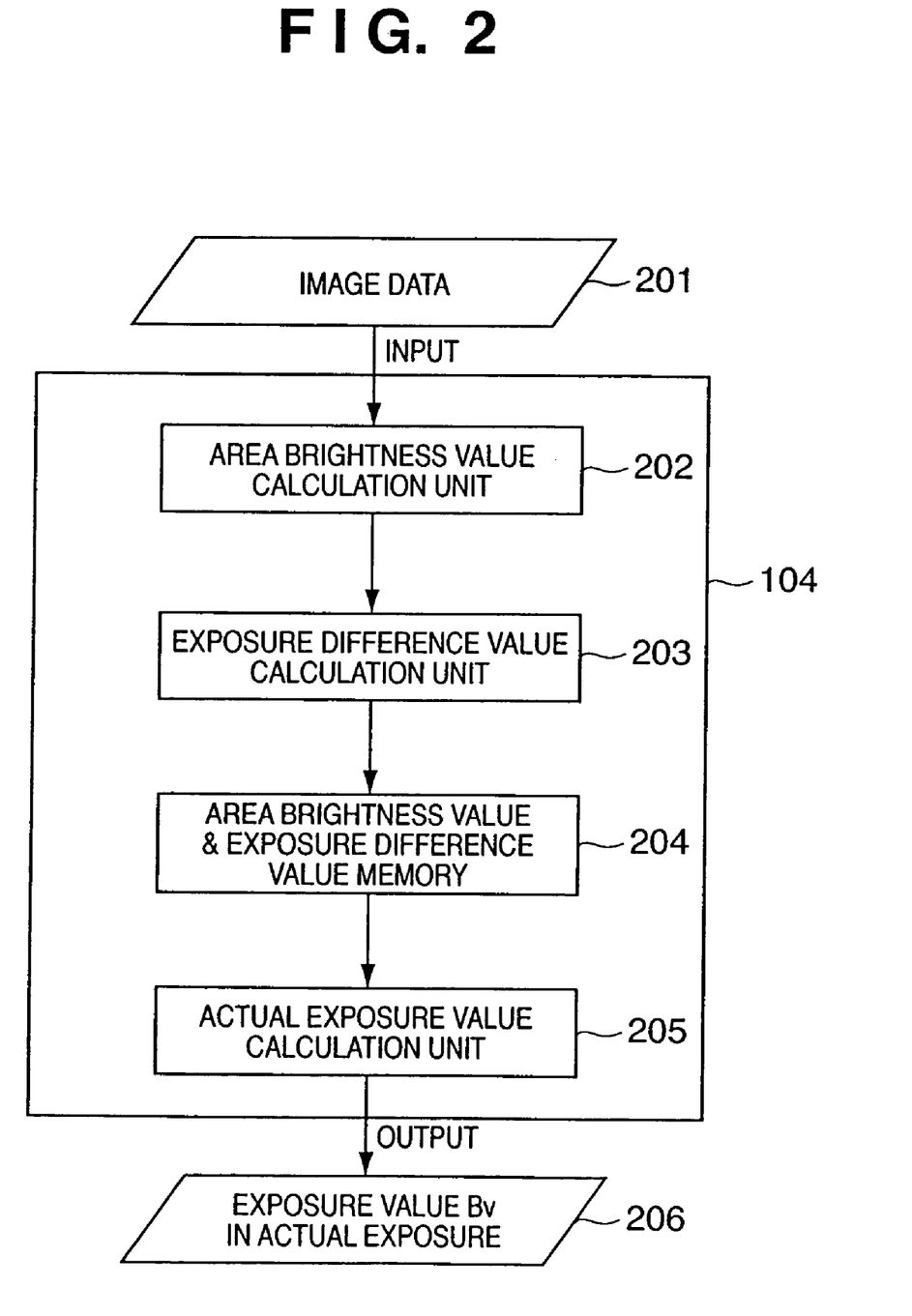
FIG. 2 is a block diagram of an AE calculation unit in the embodiment.

FIG. 2 is a block diagram showing the AE calculation unit.

The operation of the AE calculation unit 104 will be explained.

From image data 201 sent from the image pickup unit 101, an area brightness value calculation unit 202 for calculating a brightness value calculates the average brightness value (I=0,5, J=0,5) of each 6×6 area.

Figure 3:
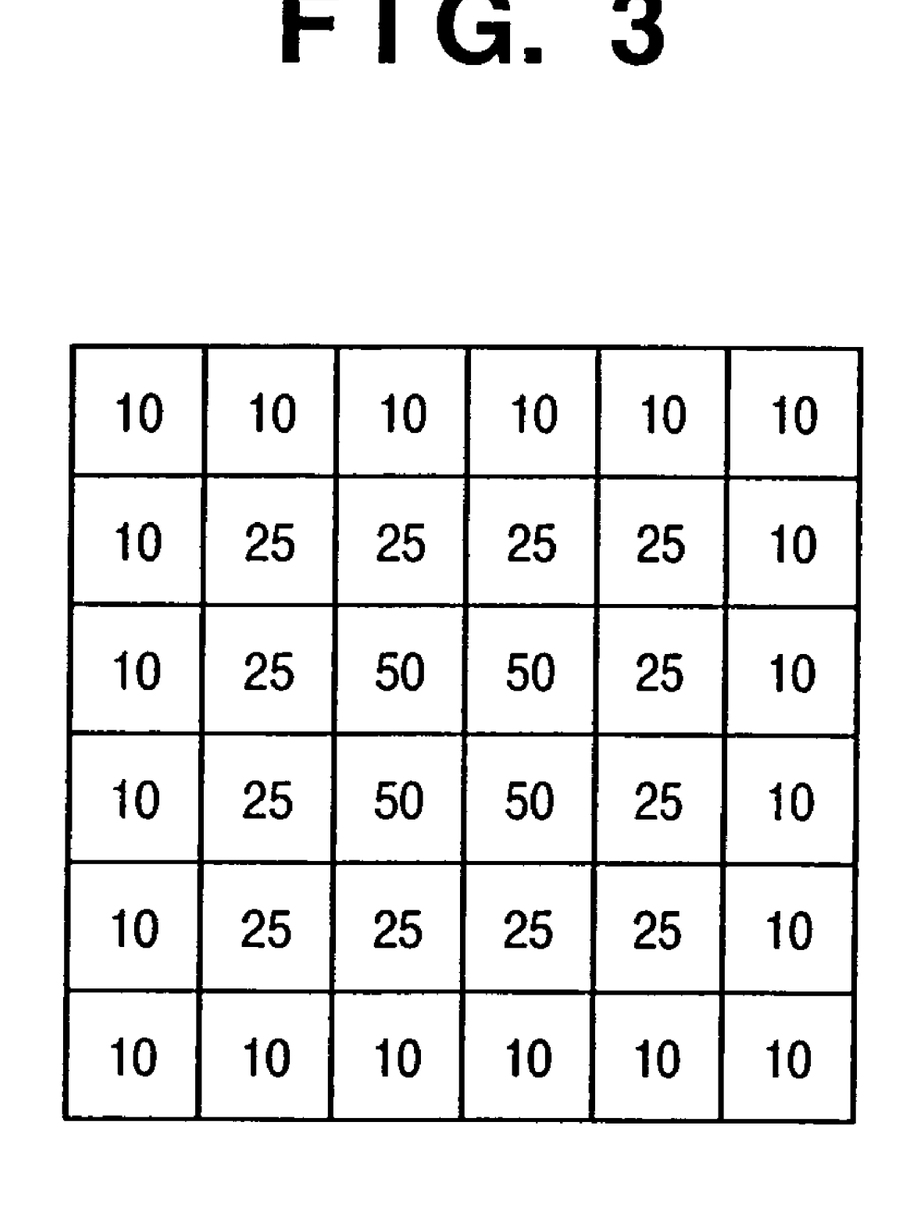
FIG. 3 is a view showing a weighting factor for each screen-split area in the embodiment.

The obtained brightness value Y(I,J) of each area is used to calculate an exposure difference value DeltaBv based on equation (1) by an exposure difference value calculation unit 203 for calculating the exposure difference value DeltaBv for a target brightness value Yref:

$$DeltaBv = \text{Log}_2\left(\frac{\sum (Y(I,J) \times \text{Weight}(I,J))}{\sum \text{Weight}(I,J) \times Yref}\right) \quad (1)$$

where Yref is the target brightness value of an image, and Weight(I,J) is the weighting factor of each area shown in FIG. 3.

The calculated exposure difference value and Y(I,J) calculated by the area brightness value calculation unit 202 are sent to an area brightness value & exposure difference value memory 204. These values are respectively stored as an exposure difference value DeltaBv0 and area brightness value Y0(I,J) upon exposure at the exposure value ControlBv0.

Similarly, the image pickup element is exposed at different exposure values ControlBv1 and ControlBv2 by the AE controller 105 in FIG. 1. An exposure difference value DeltaBv1 of a screen and an area brightness value Y1(I,J) upon exposure at the exposure value ControlBv1, and an exposure difference value DeltaBv2 of a screen and an area brightness value Y2(I,J) upon exposure at the exposure value ControlBv2 are calculated and stored in the area brightness value & exposure difference value memory 204 in FIG. 2.

These exposure values satisfy $$\text{ControlBv0} > \text{ControlBv1} > \text{ControlBv2} \quad (2)$$

After the exposure difference values DeltaBv and area brightness values Y(I,J) upon exposure of the image pickup element at the three exposure values ControlBv0, ControlBv1, and ControlBv2 are obtained, an actual exposure value calculation unit 205 for calculating an exposure value calculates an exposure value Bv 206 in actual exposure, or the basis of which an object is actually picked up for recording in a storage device, by:

For DeltaBv0≧0, $$Bv = \text{Control}Bv0 + \text{Delta}Bv0 \quad (3)$$

For DeltaBv0<0 and DeltaBv1≦0, $$Ycalc(I,J) = \frac{(Y0(I,J) \times \text{ABS}(DeltaBv1) \times 2\wedge(ControlBv0 - ControlBv1) + Y1(I,J) \times \text{ABS}(DeltaBv0))}{(\text{ABS}(DeltaBv0) + \text{ABS}(DeltaBv1))} \quad (4)$$

$$DeltaBvcalc = \text{Log}_2\left(\frac{\sum (Ycalc(I,J) \times \text{Weight}(I,J))}{\sum \text{Weight}(I,J) \times Yref}\right) \quad (5)$$

$$Bv = ControlBv1 + DeltaBvcalc \quad (6)$$

where ABS(A) is the absolute value of A.

For DeltaBv1<0 and DeltaBv2≧0, $$Ycalc(I,J) = \frac{(Y1(I,J) \times \text{ABS}(DeltaBv2) \times 2\wedge(ControlBv1 - ControlBv2) + Y2(I,J) \times \text{ABS}(DeltaBv1))}{(\text{ABS}(DeltaBv1) + \text{ABS}(DeltaBv2))} \quad (7)$$

$$DeltaBvcalc = \text{Log}_2\left(\frac{\sum (Ycalc(I,J) \times \text{Weight}(I,J))}{\sum \text{Weight}(I,J) \times Yref}\right) \quad (8)$$

$$Bv = ControlBv2 + DeltaBvcalc \quad (9)$$

For DeltaBv2<0, $$Bv = ControlBv2 + DeltaBv2 \tag{10}$$

Figure 4:
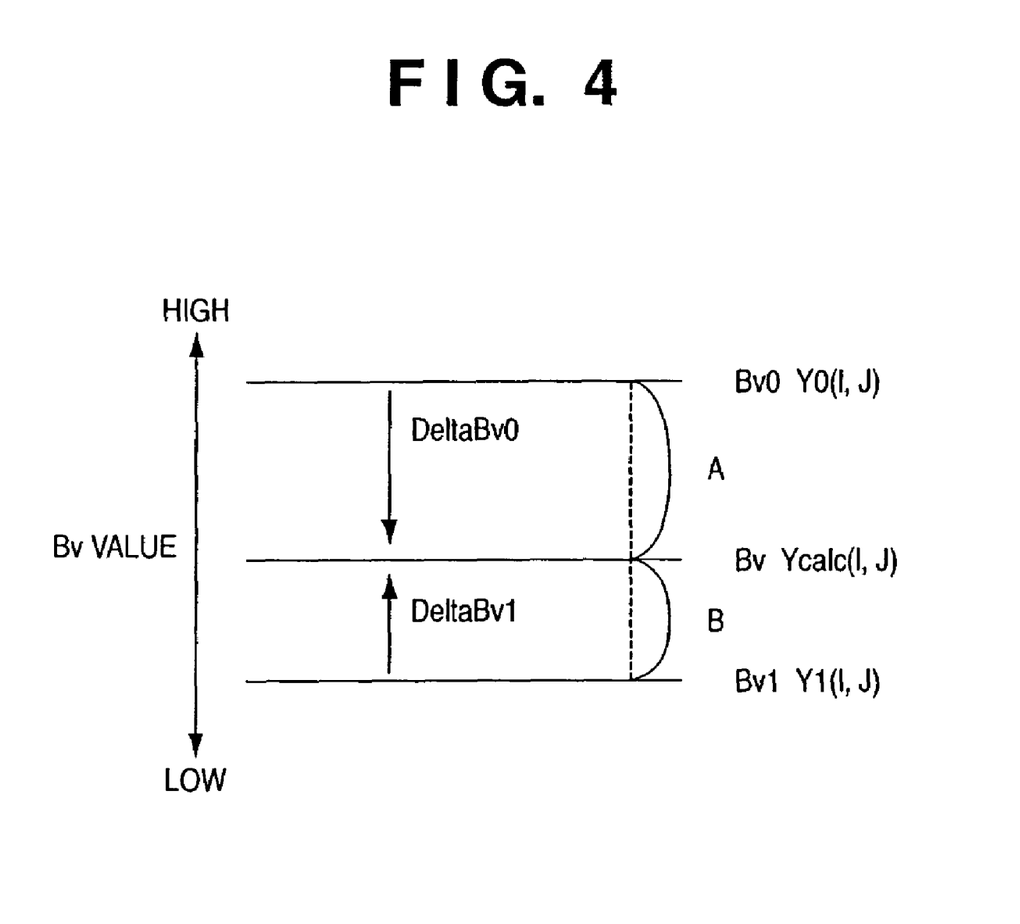
FIG. 4 is a view for explaining an exposure decision apparatus in the embodiment.

Equation (5) will be explained with reference to FIG. 4.

The ratio A:B=ABS(DeltaBv0):ABS(DeltaBv1) of the absolute values of DeltaBv0 and DeltaBv1 is calculated from the area brightness Y0(I,J) obtained upon exposure at Bv0 and the area brightness Y1(I,J) obtained upon exposure at Bv1. The calculated brightness value Ycalc(I,J) is obtained from the weighted mean of the ratio A:B. The exposure value Bv in actual exposure is calculated from the calculated brightness value Ycalc(I,J).

$2^{\wedge}$ (ControlBv0−ControlBv1) is a coefficient for converting the brightness value Y0(I,J) calculated by the exposure value ControlBv0 into a brightness value obtained upon exposure at the exposure value ControlBv1.

The exposure value Bv in actual exposure calculated by the actual exposure value calculation unit 205 is sent to the AE controller 105 in FIG. 1. The AE controller 105 decides an F-number and shutter speed for actual exposure on the basis of the exposure value Bv.

The decided F-number and shutter speed are output to the image pickup controller 103. The image pickup unit 101 executes actual exposure on the basis of these values, and an actual exposure image digital signal is sent to an image processor 106.

The actual exposure image digital signal undergoes image processing such as chromatic processing, luminance processing, edge emphasis processing, gamma processing, and JPEG conversion processing in the image processor 106. The resultant data is output to a data write unit 107 and written in a storage medium.

In this embodiment, exposure scan is done using three exposure values. The number of exposure values is not limited to three, and can be arbitrarily set to two or more as far as the shutter time lag is permitted.

As described above, according to the above embodiment, the image pickup apparatus comprises an image pickup device for picking up an object, and a processing device having a brightness value calculation unit for obtaining the brightness values of a screen at respective exposure values from a plurality of image data obtained by picking up an image by the image pickup device at a plurality of different exposure values, an exposure difference value calculation unit for calculating exposure difference values representing differences between the brightness values and a preset target brightness value in actual exposure, and an exposure value calculation unit for calculating an exposure value in actual exposure on the basis of at least two image data out of the plurality of image data in accordance with the calculation results of the exposure difference value calculation unit. The embodiment can provide an exposure decision apparatus capable of minimizing the number of exposure scan operations necessary to obtain an accurate exposure value and capable of minimizing the shutter time lag, and an image pickup apparatus having the exposure decision apparatus.

Other Embodiment

The object of the embodiment is also achieved when a storage medium (or recording medium) which stores software program codes for realizing the functions of the above-described embodiment is supplied to a system or apparatus and the computer (or the CPU or MPU) of the system or apparatus reads out and executes the program codes stored in the storage medium. In this case, the program codes read out from the storage medium realize the functions of the above-described embodiment, and the storage medium which stores the program codes constitutes the present invention. The functions of the above-described embodiment are realized when the computer executes the readout program codes. Also, the functions of the above-described embodiment are realized when an OS (Operating System) running on the computer performs part or all of actual processing on the basis of the instructions of the program codes.

Furthermore, the functions of the above-described embodiment are realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

The present invention is not limited to the above embodiments and various changes and modifications can be made within the spirit and scope of the present invention. Therefore, to apprise the public of the scope of the present invention the following claims are made.

What is claimed is:

1. An image pickup apparatus comprising:
   an image pickup device that picks up an object; and
   a processing device having
   a brightness value calculation unit that obtains a plurality of brightness values at respective exposure values from a plurality of image data obtained by picking up an image of the object by said image pickup device at a plurality of different exposure values,
   an exposure difference value calculation unit that calculates a plurality of exposure difference values representing differences between the brightness values and a preset target brightness value in actual exposure, and
   an exposure value calculation unit configured to calculate an exposure value in actual exposure on the basis of at least two image data of the plurality of image data in accordance with calculation results of said exposure difference value calculation unit,
   wherein said exposure difference calculation unit calculates the exposure difference values with respect to said at least two image data, and said exposure value calculation unit calculates the exposure value in actual exposure using a ratio of the exposure difference values.

2. The apparatus according to claim 1, wherein said brightness value calculation unit calculates a brightness value for each of a plurality of screen-split blocks of the image data.

3. An exposure decision method comprising:
   a brightness value calculation step of obtaining brightness values of an image at respective exposure values from a plurality of image data obtained by picking up an image at a plurality of different exposure values;
   an exposure difference value calculation step of calculating exposure difference values representing differences between the brightness values and a preset target brightness value in actual exposure; and
   an exposure value calculation step of calculating an exposure value in actual exposure on the basis of at least two image data of the plurality of image data, and using different formulas in accordance with calculation results in the exposure difference value calculation steps, wherein said exposure difference value calculation step calculates the exposure difference values with respect to said at least two image data, and said exposure value calculation step calculates the exposure value in actual exposure by using a ratio of the exposure difference values.

4. The method according to claim 3, wherein in the brightness value calculation step, a brightness value is calculated for each of a plurality of screen-split blocks of the image data.

5. A program in a computer readable medium encoded with instructions for causing a computer to execute the exposure decision method defined in claim 3.

6. A computer readable storage medium storing the program defined in claim 5.

7. The apparatus according to claim 1, wherein said exposure value calculation unit calculates the exposure value in actual exposure by calculating a weighted average of said at least two image data.

8. The method according to claim 3, wherein said exposure value calculation step calculates the exposure value in actual exposure by calculating a weighted average of said at least two image data.

* * * * *

UNITED STATES PATENT AND TRADEMARK OFFICE
CERTIFICATE OF CORRECTION

PATENT NO. : 7,024,108 B2  Page 1 of 1
DATED : April 4, 2006
INVENTOR(S) : Kenji Takahashi It is certified that error appears in the above-identified patent and that said Letters Patent is hereby corrected as shown below:

<u>Column 6,</u>
Line 67, delete "steps," and insert -- step, --.

Signed and Sealed this

Twenty-third Day of May, 2006

JON W. DUDAS
*Director of the United States Patent and Trademark Office*